United States Patent
Chiba et al.

(10) Patent No.: US 11,652,845 B2
(45) Date of Patent: May 16, 2023

(54) ATTACK COUNTERMEASURE DETERMINATION APPARATUS, ATTACK COUNTERMEASURE DETERMINATION METHOD, AND ATTACK COUNTERMEASURE DETERMINATION PROGRAM

(71) Applicant: NIPPON TELEGRAPH AND TELEPHONE CORPORATION, Tokyo (JP)

(72) Inventors: Daiki Chiba, Musashino (JP); Mitsuaki Akiyama, Musashino (JP); Takeshi Yagi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 492 days.

(21) Appl. No.: 16/485,171

(22) PCT Filed: Aug. 22, 2017

(86) PCT No.: PCT/JP2017/029941
§ 371 (c)(1),
(2) Date: Aug. 12, 2019

(87) PCT Pub. No.: WO2018/163464
PCT Pub. Date: Sep. 13, 2018

(65) Prior Publication Data
US 2020/0045077 A1 Feb. 6, 2020

(30) Foreign Application Priority Data
Mar. 9, 2017 (JP) .............................. JP2017-045000

(51) Int. Cl.
H04L 29/06 (2006.01)
H04L 9/40 (2022.01)
H04L 61/4511 (2022.01)

(52) U.S. Cl.
CPC ...... *H04L 63/1483* (2013.01); *H04L 61/4511* (2022.05); *H04L 63/1466* (2013.01)

(58) Field of Classification Search
CPC ............. H04L 63/1483; H04L 61/1511; H04L 63/1466
See application file for complete search history.

(56) References Cited

U.S. PATENT DOCUMENTS 8,850,571 B2 * 9/2014 Staniford ............ G06F 9/45533
713/188
9,317,680 B2 * 4/2016 Carter, III ............. G06F 16/951
(Continued)

FOREIGN PATENT DOCUMENTS

JP 2004-280724 A 10/2004
JP 2006-279531 A 10/2006
(Continued)

OTHER PUBLICATIONS

Daiki Chiva, "DomainProfiler: Discovering Domain Names Abused in Future", 2016, 491-502 (Year: 2016).*
(Continued)

*Primary Examiner* — Wasika Nipa
(74) *Attorney, Agent, or Firm* — Xsensus LLP

(57) ABSTRACT

An attack countermeasure determination includes a domain name input unit that receives any domain name as input, and acquires setting information corresponding to the domain name, registration information corresponding to the domain name, and external information corresponding to an internet protocol (IP) address corresponding to the domain name, as feature information on the domain name, an attack counter- (Continued)

measure determination unit that specifies a pre-designated category for the domain name on the basis of the feature information and determines, in a stepwise manner, an attack countermeasure against the domain name in accordance with the specified category, and an attack countermeasure information output unit that outputs attack countermeasure information corresponding to the attack countermeasure.

6 Claims, 16 Drawing Sheets

(56) References Cited

U.S. PATENT DOCUMENTS

| | | | | |
|---|---|---|---|---|
| 10,419,463 | B2* | 9/2019 | Muddu | G06F 16/285 |
| 2004/0187034 | A1 | 9/2004 | Tamura et al. | |
| 2008/0086574 | A1* | 4/2008 | Raciborski | H04L 61/4541 709/245 |
| 2015/0180892 | A1* | 6/2015 | Balderas | H04L 61/4511 726/22 |
| 2017/0118241 | A1* | 4/2017 | Call | H04L 67/535 |
| 2017/0324766 | A1* | 11/2017 | Gonzalez Granadillo | H04L 63/20 |
| 2018/0139235 | A1* | 5/2018 | Desai | H04L 63/1483 |
| 2018/0270254 | A1 | 9/2018 | Chiba et al. | |

FOREIGN PATENT DOCUMENTS

| | | |
|---|---|---|
| WO | 2016/140038 A1 | 9/2016 |
| WO | 2016/186996 A1 | 11/2016 |

OTHER PUBLICATIONS

International Search Report and Written Opinion dated Oct. 17, 2017 for PCT/JP2017/029941 filed on Aug. 22, 2017, 6 pages including English Translation of the International Search Report.
Chiba, "Detecting Malicious Domain Names based on the Time-series Analysis of Attackers Networks Resources", IEICE Technical Report, vol. 115, No. 81, Jun. 2015, pp. 51-56.
Ma et a., "Beyond Blacklists: Learning to Detect Malicious Web Sites from Suspicious URLs", 9 pages.
Felegyhazi et al., "On the Potential of Proactive Domain Blacklisting", 8 pages.
Antonakakis et al., "Building a Dynamic Reputation System for DNS", 17 pages.
Chiba et al., "DomainProfiler: Discovering Domain Names Abused in Future", 46th Annual IEEE/IFIP International Conference on Dependable Systems and Networks, 2016, pp. 491-502.
Hao et al., "Predator: Proactive Recognition and Elimination of Domain Abuse at Time-of-Registration", 12 pages.
Sato et al., "Extending Black Domain Name List by Using Co-occurrence Relation between DNS queries", 8 pages.
Bilge et al., "EXPOSURE: Finding Malicious Domains Using Passive DNS Analysis", 17 pages.
Antonakakis et al., "Detecting Malware Domains at the Upper DNS Hierarchy", pp. 1-16.
Antonakakis et al., "From Throw-Away Traffic to Bots : Detecting the Rise of DGA-Based Malware", 16 pages.
Rahbarinia et al., "Segugio: Efficient Behavior-Based Tracking of Malware-Control Domains in Large ISP Networks", 45th Annual IEEE/IFIP International Conference on Dependable Systems and Networks, 2015, pp. 403-114.
Zarras et al., "The Dark Alleys of Madison Avenue: Understanding Malicious Advertisements", pp. 373-379.
Gilad et al., "CDN-on-Demand: An Affordable DDoS Defense via Untrusted Clouds", pp. 1-16.
Akiyama et al., "Searching structural neighborhood of malicious URLs to improve blacklisting", 2011 IEEE/IPSJ International Symposium on Applications and the Internet, pp. 1-10.
Schiavoni et al., "Phoenix: DGA-Based Botnet Tracking and Intelligence", pp. 192-211.
Lever et al., "Domain-Z: 28 Registrations Later", Measuring the Exploitation of Residual Trust in Domains, 16 pages.
Kuhrer et al., "Paint It Black: Evaluating the Effectiveness of Malware Blacklists", Proc. RAID, 2014, pp. 1-21.
Vissers et al., "Parking Sensors: Analyzing and Detecting Parked Domains", pp. 1-14.
Szurdi et al.,"The Long "Taile" of Typosquatting Domain Names", 23rd USENIX Security Symposium, Aug. 20-22, 2014, pp. 191-206.
Li et al., "Finding the Linchpins of the Dark Web: a Study on Topologically Dedicated Hosts on Malicious Web Infrastructures", 2013 IEEE Symposium on Security and Privacy, pp. 112-126.
Rahbarinia et al., "Real-Time Detection of Malware Downloads via Large-Scale URL→File→Machine Graph Mining", pp. 783-794.
Office Action dated Apr. 21, 2020 in Japanese Patent Application No. 2019-504300, 7 pages.
Extended European Search Report dated Jun. 9, 2020, issued in corresponding European Patent Application No. 178997292.

* cited by examiner

FIG.2

| SERIAL NUMBER | DOMAIN NAME |
|---|---|
| 1 | example.com |
| 2 | example.net |
| 3 | example.org |
| 4 | malicious.advertisement.example |
| 5 | malicious.cdn.example |
| 6 | malicious.Webhosting.example |
| 7 | rand0m1y-generated-d0ma1n.example |
| 8 | re-registered.example |
| 9 | sinkholed.example |
| 10 | parked.example |
| 11 | typpo.example |
| 12 | no-content.example |
| 13 | dynamic123.dynamicdns.example |
| 14 | free123.example |
| 15 | user1.domainhosting.example |
| ... | ... |

FIG.3

| SERIAL NUMBER | DOMAIN NAME | A RECORD | NS RECORD | SOA RECORD | ⋮ |
|---|---|---|---|---|---|
| 1 | example.com | 192.0.2.2 | ns1.example.com | ns1.example.com. nobody.localhost. 42 86400 43200 604800 10800 | ⋮ |
| 2 | example.net | 198.51.100.100 | ns1.example.net | ns1.example.net. nobody.localhost. 42 86400 43200 604800 10800 | ⋮ |
| 3 | example.org | 203.0.113.113 | ns1.example.org | ns1.example.org. nobody.localhost. 42 86400 43200 604800 10800 | ⋮ |
| ⋮ | ⋮ | ⋮ | ⋮ | ⋮ | ⋮ |

FIG.4

| SERIAL NUMBER | DOMAIN NAME | WHOIS SERVER NAME | NS SERVER NAME | DOMAIN NAME REGISTRATION DATE | DOMAIN NAME UPDATE DATE | DOMAIN NAME EXPIRATION DATE | ... |
|---|---|---|---|---|---|---|---|
| 1 | example.com | whois.example.com | ns1.example.com | JANUARY 1, 2001 | JANUARY 1, 2016 | JANUARY 1, 2017 | ... |
| 2 | example.net | whois.example.net | ns1.example.org | JANUARY 1, 2001 | JANUARY 1, 2016 | JANUARY 1, 2017 | ... |
| 3 | example.org | whois.example.org | ns1.example.net | JANUARY 1, 2001 | JANUARY 1, 2016 | JANUARY 1, 2017 | ... |
| ... | ... | ... | ... | ... | ... | ... | ... |

FIG.5

| SERIAL NUMBER | IP ADDRESS | ADDRESS PREFIX | AS NUMBER | OWNER ORGANI-ZATION NAME | COUNTRY | RIR | ADDRESS ALLOCATION DATE | ... |
|---|---|---|---|---|---|---|---|---|
| 1 | 192.0.2.2 | 192.0.2.0/24 | 64498 | TEST-NET-1 | US | ARIN | JANUARY 1, 2001 | ... |
| 2 | 198.51.100.100 | 198.51.100.0/24 | 64450 | TEST-NET-2 | US | ARIN | JANUARY 1, 2001 | ... |
| 3 | 203.0.113.113 | 203.0.113.0/24 | 64452 | TEST-NET-3 | US | ARIN | FEBRUARY 1, 2001 | ... |
| ... | ... | ... | ... | ... | ... | ... | ... | ... |

FIG.6

| SERIAL NUMBER | DOMAIN NAME | CATEGORY | | | | | | | | | | | |
|---|---|---|---|---|---|---|---|---|---|---|---|---|---|
| | | ADVERTISEMENT | CDN | Web HOSTING | DGA | RE-REGISTRATION | SINKHOLE | PARKING | TYPOSQUATTING | NO-CONTENT | DYNAMIC DNS | FREE | DOMAIN NAME HOSTING |
| 1 | example.com | | | | | | | | | | | | |
| 2 | example.net | | | | | | | | | ● | | | |
| 3 | example.org | | | | | | | | | ● | | | |
| 4 | malicious.advertisement.example | ● | | | | | | | | | | | |
| 5 | malicious.cdn.example | | ● | | | | | | | | | | |
| 6 | malicious.Webhosting.example | | | ● | | | | | | | | | |
| 7 | rand0m1y-generated-d0ma1n.example | | | | ● | | | | | | | | |
| 8 | re-registered.example | | | | | ● | | | | | | | |
| 9 | sinkholed.example | | | | | | ● | | | | | | |
| 10 | parked.example | | | | | | | ● | | | | | |
| 11 | typpo.example | | | | | | | | ● | | | | |
| 12 | no-content.example | | | | | | | | | ● | | | |
| 13 | dynamic123.dynamicdns.example | | | | | | | | | | ● | | |
| 14 | free123.example | | | | | | | | | | | ● | |
| 15 | user1.domainhosting.example | | | | | | | | | | | | ● |
| ⋮ | ⋮ | ⋮ | ⋮ | ⋮ | ⋮ | ⋮ | ⋮ | ⋮ | ⋮ | ⋮ | ⋮ | ⋮ | ⋮ |

FIG.9

| SERIAL NUMBER | CATEGORY | FEATURE OF MALICIOUS DOMAIN NAME BELONGING TO CATEGORY | ATTACK COUNTER-MEASURE MEANS AGAINST MALICIOUS DOMAIN NAME BELONGING TO CATEGORY |
|---|---|---|---|
| 1 | ADVERTISEMENT | ABUSE OF AUTHORIZED SERVICE | Web COMMUNICATION LEVEL |
| 2 | CDN | ABUSE OF AUTHORIZED SERVICE | Web COMMUNICATION LEVEL |
| 3 | Web HOSTING | ABUSE OF AUTHORIZED SERVICE | Web COMMUNICATION LEVEL |
| 4 | DGA | ATTACK ONLY | DNS COMMUNICATION LEVEL |
| 5 | RE-REGISTRATION | ATTACK ONLY | DNS COMMUNICATION LEVEL |
| 6 | SINKHOLE | ATTACK ONLY | DNS COMMUNICATION LEVEL |
| 7 | PARKING | ATTACK ONLY | DNS COMMUNICATION LEVEL |
| 8 | TYPOSQUATTING | ATTACK ONLY | DNS COMMUNICATION LEVEL |
| 9 | NO-CONTENT | ATTACK ONLY | DNS COMMUNICATION LEVEL |
| 10 | DYNAMIC DNS | ATTACK ONLY | DNS COMMUNICATION LEVEL |
| 11 | FREE | ATTACK ONLY | DNS COMMUNICATION LEVEL |
| 12 | DOMAIN NAME HOSTING | ATTACK ONLY | DNS COMMUNICATION LEVEL |
| ... | ... | ... | ... |

FIG.10

| SERIAL NUMBER | CATEGORY | FEATURE OF MALICIOUS DOMAIN NAME BELONGING TO CATEGORY | ATTACK COUNTERMEASURE GRANULARITY FOR MALICIOUS DOMAIN NAME BELONGING TO CATEGORY |
|---|---|---|---|
| 1 | ADVERTISEMENT | ABUSE OF AUTHORIZED SERVICE | URL OR CONTENT INFORMATION |
| 2 | CDN | ABUSE OF AUTHORIZED SERVICE | URL OR CONTENT INFORMATION |
| 3 | Web HOSTING | ABUSE OF AUTHORIZED SERVICE | URL OR CONTENT INFORMATION |
| 4 | DGA | THERE ARE NO ATTACK ONLY AND DOMAIN NAME WITH DIFFERENT PURPOSE UNDER UPPER OR LOWER DOMAIN NAME OF DOMAIN NAME | SECOND LEVEL DOMAIN NAME (2LD) INFORMATION |
| 5 | RE-REGISTRATION | THERE ARE NO ATTACK ONLY AND DOMAIN NAME WITH DIFFERENT PURPOSE UNDER UPPER OR LOWER DOMAIN NAME OF DOMAIN NAME | SECOND LEVEL DOMAIN NAME (2LD) INFORMATION |
| 6 | SINKHOLE | THERE ARE NO ATTACK ONLY AND DOMAIN NAME WITH DIFFERENT PURPOSE UNDER UPPER OR LOWER DOMAIN NAME OF DOMAIN NAME | SECOND LEVEL DOMAIN NAME (2LD) INFORMATION |
| 7 | PARKING | THERE ARE NO ATTACK ONLY AND DOMAIN NAME WITH DIFFERENT PURPOSE UNDER UPPER OR LOWER DOMAIN NAME OF DOMAIN NAME | SECOND LEVEL DOMAIN NAME (2LD) INFORMATION |
| 8 | TYPOSQUATTING | THERE ARE NO ATTACK ONLY AND DOMAIN NAME WITH DIFFERENT PURPOSE UNDER UPPER OR LOWER DOMAIN NAME OF DOMAIN NAME | SECOND LEVEL DOMAIN NAME (2LD) INFORMATION |
| 9 | NO-CONTENT | THERE ARE NO ATTACK ONLY AND DOMAIN NAME WITH DIFFERENT PURPOSE UNDER UPPER OR LOWER DOMAIN NAME OF DOMAIN NAME | SECOND LEVEL DOMAIN NAME (2LD) INFORMATION |
| 10 | DYNAMIC DNS | THERE ARE ATTACK ONLY AND DOMAIN NAME WITH DIFFERENT PURPOSE UNDER UPPER OR LOWER DOMAIN NAME OF DOMAIN NAME | FULLY QUALIFIED DOMAIN NAME (FQDN) INFORMATION |
| 11 | FREE | THERE ARE ATTACK ONLY AND DOMAIN NAME WITH DIFFERENT PURPOSE UNDER UPPER OR LOWER DOMAIN NAME OF DOMAIN NAME | FULLY QUALIFIED DOMAIN NAME (FQDN) INFORMATION |
| 12 | DOMAIN NAME HOSTING | THERE ARE ATTACK ONLY AND DOMAIN NAME WITH DIFFERENT PURPOSE UNDER UPPER OR LOWER DOMAIN NAME OF DOMAIN NAME | FULLY QUALIFIED DOMAIN NAME (FQDN) INFORMATION |
| ... | ... | ... | ... |

FIG.11

| SERIAL NUMBER | CATEGORY | FEATURE OF MALICIOUS DOMAIN NAME BELONGING TO CATEGORY | ATTACK COUNTERMEASURE EXPIRATION DATE FOR MALICIOUS DOMAIN NAME BELONGING TO CATEGORY |
|---|---|---|---|
| 1 | ADVERTISEMENT | USED IN ADVERTISEMENT DELIVERY | LONG PERIOD (FOR EXAMPLE, 14 DAYS) |
| 2 | CDN | USED IN CDN | LONG PERIOD (FOR EXAMPLE, 14 DAYS) |
| 3 | Web HOSTING | USED IN Web HOSTING | LONG PERIOD (FOR EXAMPLE, 14 DAYS) |
| 4 | DGA | AUTOMATICALLY GENERATED IN ALGORITHM EVERYDAY | SHORT PERIOD (FOR EXAMPLE, 24 HOURS) |
| 5 | RE-REGISTRATION | EXPIRED ONCE TO BE RE-REGISTERED | LONG PERIOD (FOR EXAMPLE, 14 DAYS) |
| 6 | SINKHOLE | USED IN SINKHOLE | LONG PERIOD (FOR EXAMPLE, 14 DAYS) |
| 7 | PARKING | USED IN PARKING | LONG PERIOD (FOR EXAMPLE, 14 DAYS) |
| 8 | TYPOSQUATTING | USED IN TYPOSQUATTING | LONG PERIOD (FOR EXAMPLE, 14 DAYS) |
| 9 | NO-CONTENT | THERE IS NO CONTENT UNDER DOMAIN NAME | LONG PERIOD (FOR EXAMPLE, 14 DAYS) |
| 10 | DYNAMIC DNS | CAPABLE OF BING GENERATED AUTOMATICALLY AND AT LOW COST | SHORT PERIOD (FOR EXAMPLE, 24 HOURS) |
| 11 | FREE | CAPABLE OF BEING ACQUIRED FREE OF CHARGE | SHORT PERIOD (FOR EXAMPLE, 24 HOURS) |
| 12 | DOMAIN NAME HOSTING | USED IN DOMAIN NAME HOSTING | LONG PERIOD (FOR EXAMPLE, 14 DAYS) |
| ... | ... | ... | ... |

FIG.12

| SERIAL NUMBER | DOMAIN NAME | ATTACK COUNTERMEASURE MEANS | ATTACK COUNTERMEASURE GRANULARITY | ATTACK COUNTER-MEASURE INFORMATION EXPIRATION DATE |
|---|---|---|---|---|
| 1 | example.com | DNS COMMUNICATION LEVEL | 2LD INFORMATION | LONG PERIOD (FOR EXAMPLE, 14 DAYS) |
| 2 | example.net | DNS COMMUNICATION LEVEL | 2LD INFORMATION | LONG PERIOD (FOR EXAMPLE, 14 DAYS) |
| 3 | example.org | DNS COMMUNICATION LEVEL | 2LD INFORMATION | LONG PERIOD (FOR EXAMPLE, 14 DAYS) |
| 4 | malicious.advertisement.example | Web COMMUNICATION LEVEL | URL/CONTENT INFORMATION | LONG PERIOD (FOR EXAMPLE, 14 DAYS) |
| 5 | malicious.cdn.example | Web COMMUNICATION LEVEL | URL/CONTENT INFORMATION | LONG PERIOD (FOR EXAMPLE, 14 DAYS) |
| 6 | malicious.Webhosting.example | Web COMMUNICATION LEVEL | URL/CONTENT INFORMATION | LONG PERIOD (FOR EXAMPLE, 14 DAYS) |
| 7 | rand0m1y-generated-d0ma1n.example | DNS COMMUNICATION LEVEL | 2LD INFORMATION | SHORT PERIOD (FOR EXAMPLE, 24 HOURS) |
| 8 | re-registered.example | DNS COMMUNICATION LEVEL | 2LD INFORMATION | LONG PERIOD (FOR EXAMPLE, 14 DAYS) |
| 9 | sinkholed.example | DNS COMMUNICATION LEVEL | 2LD INFORMATION | LONG PERIOD (FOR EXAMPLE, 14 DAYS) |
| 10 | parked.example | DNS COMMUNICATION LEVEL | 2LD INFORMATION | LONG PERIOD (FOR EXAMPLE, 14 DAYS) |
| 11 | typpo.example | DNS COMMUNICATION LEVEL | 2LD INFORMATION | LONG PERIOD (FOR EXAMPLE, 14 DAYS) |
| 12 | no-content.example | DNS COMMUNICATION LEVEL | 2LD INFORMATION | LONG PERIOD (FOR EXAMPLE, 14 DAYS) |
| 13 | dynamic123.dynamicdns.example | DNS COMMUNICATION LEVEL | FQDN INFORMATION | SHORT PERIOD (FOR EXAMPLE, 24 HOURS) |
| 14 | free123.example | DNS COMMUNICATION LEVEL | FQDN INFORMATION | SHORT PERIOD (FOR EXAMPLE, 24 HOURS) |
| 15 | user1.domainhosting.example | DNS COMMUNICATION LEVEL | FQDN INFORMATION | LONG PERIOD (FOR EXAMPLE, 14 DAYS) |
| ... | ... | ... | ... | ... |

FIG.13

| SERIAL NUMBER | PLACE WHERE ATTACK COUNTER-MEASURE MEANS IS IMPLEMENTED | ATTACK COUNTERMEASURE MEANS |
|---|---|---|
| 1 | CACHE DNS SERVER | FILTERING OF DNS COMMUNICATION LEVEL |
| 2 | AUTHORITATIVE DNS SERVER | FILTERING OF DNS COMMUNICATION LEVEL OR ADMINISTRATOR NOTIFICATION |
| 3 | Web SERVER | FILTERING OF Web COMMUNICATION LEVEL OR ADMINISTRATOR NOTIFICATION |
| 4 | SECURITY APPLIANCE | FILTERING OF DNS COMMUNICATION LEVEL OR Web COMMUNICATION LEVEL |
| ... | ... | ... |

FIG.14

| SERIAL NUMBER | DOMAIN NAME |
|---|---|
| 1 | example.com |
| 2 | example.net |
| 3 | example.org |
| 4 | rand0m1y-generated-d0ma1n.example |
| 5 | re-registered.example |
| 6 | sinkholed.example |
| 7 | parked.example |
| 8 | typpo.example |
| 9 | no-content.example |
| 10 | dynamic123.dynamicdns.example |
| 11 | free123.example |
| 12 | user1.domainhosting.example |
| ... | ... |

FIG.15

| SERIAL NUMBER | DOMAIN NAME |
|---|---|
| 1 | rand0m1y-generated-d0ma1n.example |
| 2 | re-registered.example |
| 3 | sinkholed.example |
| 4 | parked.example |
| 5 | typpo.example |
| 6 | no-content.example |
| 7 | dynamic123.dynamicdns.example |
| 8 | free123.example |
| 9 | user1.domainhosting.example |
| ... | ... |

FIG.16

| SERIAL NUMBER | URL/CONTENT |
|---|---|
| 1 | http://malicious.Webhosting.example/~user1/index.html |
| ... | ... |

FIG.17

| SERIAL NUMBER | DOMAIN NAME OR URL/CONTENT |
|---|---|
| 1 | example.com |
| 2 | example.net |
| 3 | example.org |
| 4 | http://malicious.advertisement.example/components/models/malicious.swf |
| 5 | http://d2hi0erji65e3x.malicious.cdn.example/a1/4d6c80/10152762506576245.html |
| 6 | http://malicious.Webhosting.example/~user1/index.html |
| 7 | rand0m1y-generated-d0ma1n.example |
| 8 | re-registered.example |
| 9 | sinkholed.example |
| 10 | parked.example |
| 11 | typpo.example |
| 12 | no-content.example |
| 13 | dynamic123.dynamicdns.example |
| 14 | free123.example |
| 15 | user1.domainhosting.example |
| ... | ... |

ATTACK COUNTERMEASURE DETERMINATION APPARATUS, ATTACK COUNTERMEASURE DETERMINATION METHOD, AND ATTACK COUNTERMEASURE DETERMINATION PROGRAM

CROSS-REFERENCE TO RELATED APPLICATIONS

The present application is based on PCT filing PCT/JP2017/029941, filed Aug. 22, 2017, which claims priority to JP 2017-045000, filed Mar. 9, 2017, the entire contents of each are incorporated herein by reference.

FIELD

The present invention relates to an attack countermeasure determination apparatus, an attack countermeasure determination method, and an attack countermeasure determination program.

BACKGROUND

Attackers who implement cyber attacks use a domain name and a domain name system (DNS) as a communication infrastructure in many cases. For example, the attackers distribute malicious software called malware while using new domain names one after another, and control terminals infected with the malware. Furthermore, the attackers abuse domain names similar to authorized service names or famous entrepreneurs' names to deceive users, and conduct phishing attacks.

As a countermeasure against the domain name (hereinafter, referred to as a malicious domain name) abused in such cyber attacks, a countermeasure has been implemented to prevent the cyber attacks by specifying the malicious domain name and monitoring communication addressed to the specified malicious domain name on a communication path.

For example, in relation to DNS communication, a cache DNS server disposed in a local network or an internee service provider (ISP) implements a countermeasure to filter communication addressed to the malicious domain name from users. Furthermore, in relation to the DNS communication, an authoritative DNS server implements a countermeasure such as deleting a resource record for the malicious domain name.

For example, in relation to web communication such as HTTP/HTTPS, a security appliance, which is represented by an intrusion detection system (IDS), an intrusion prevention system (IPS), and a deep packet inspection (DPI) disposed in the local network, implements a countermeasure to filter communication addressed to the malicious domain name from users or a countermeasure to specify and delete malicious content on a web server.

CITATION LIST

Non-Patent Literature

Non-Patent Literature 1: J. Ma, L. K. Saul, S. Savage, and G. N. Voelker, "Beyond Blacklists: Learning to Detect Malicious Web Sites from Suspicious URLs", Proc. 15th ACM KDD, p. 1245, 2009.

Non-Patent Literature 2: M. Felegyhazi, C. Kreibich, and V. Paxson, "On the Potential of Proactive Domain. Blacklisting", Proc. USENIX LEET, vol. 42, no. 8, p. 6, 2010.

Non-Patent Literature 3: M. Antonakakis, R. Perdisci, D. Dagon, W. Lee, and N. Feamster, "Building a Dynamic Reputation System for DNS", Proc. 19th USENIX Security Symposium, 2010.

Non-Patent Literature 4: D. Chiba, T. Yagi, M. Akiyama, T. Shibahara, T. Yada, T. Mori, and S. Goto, "DomainProfiler: Discovering Domain Names Abused in Future", Proc. 46th IEEE/IFIP DSN, pp. 491-502, June 2016.

Non-Patent Literature 5: S. Hao, A. Kantchelian, B. Miller, V. Paxson, and N. Feamster, "PREDATOR: Proactive Recognition and Elimination of Domain Abuse at Time-Of-Registration", Proc. ACM CCS, pp. 1568-1579, 2016.

Non-Patent Literature 6: K. Sato, K. Ishibashi, T. Toyono, and N. Miyake, "Extending Black Domain Name List by Using Co-occurrence Relation between. DNS queries", Proc. USENIX LEET, 2010.

Non-Patent Literature 7: L. Bilge, E. Kirda, C. Kruegel, and M. Balduzzi, "EXPOSURE: Finding Malicious Domains Using Passive DNS Analysis", NDSS, pp. 1-17, 2011.

Non-Patent Literature 8: M. Antonakakis, R. Perdisci, W. Lee, N. V. Ii, and D. Dagon, "Detecting Malware Domains at the Upper DNS Hierarchy", Proc. 20th USENIX Security Symposium, 2011.

Non-Patent Literature 9: M. Antonakakis, R. Perdisci, Y. Nadji, "From Throw-Away Traffic to Bots: Detecting the Rise of DGA-Based Malware", Proc. the 21st USENIX Security Symposium, 2012.

Non-Patent Literature 10: B. Rahbarinia, R. Perdisci, and M. Antonakakis, "Segugio: Efficient. Behavior-Based Tracking of Malware-Control Domains in Large ISP Networks", Proc. 45th IEEE/IFIP DSN, no. 3, pp. 403-414, June 2015.

Non-Patent Literature 11: A. Zarras, A. Kapravelos, G. Stringhini, T. Holz, C. Kruegel, and G. Vigna, "The Dark Alleys of Madison Avenue: Understanding Malicious Advertisements", Proc. ACM IMC, 2014.

Non-Patent Literature 12: Y. Gilad, A. Herzberg, M. Sudkovitch, and M. Goberman, "CDN-on-Demand: An. Affordable DDoS Defense via Untrusted Clouds", Proc. NDSS, 2016.

Non-Patent Literature 13: M. Akiyama, T. Yagi, and M. Itoh, "Searching structural neighborhood of malicious URLs to improve blacklisting", Proc. IEEE/IPSJ SAINT, pp. 1-10, July 2011.

Non-Patent Literature 14: S. Schiavoni, F. Maggi, L. Cavallaro, and S. Zanero, "Phoenix: DGA-Based Botnet Tracking and Intelligence", Proc. DIMVA, 2014.

Non-Patent Literature 15: C. Lever, R. Walls, Y. Nadji, D. Dagon, P. McDaniel, and M. Antonakakis, "Domain-Z: 28 Registrations Later", Proc. IEEE S&P, 2016.

Non-Patent Literature 16: M. Kuhrer, C. Rossow, and T. Holz, "Paint It Black: Evaluating the Effectiveness of Malware Blacklists", Proc. RAID 2014.

Non-Patent Literature 17: T. Vissers, W. Joosen, and N. Nikiforakis, "Parking Sensors: Analyzing and Detecting Parked Domains", Proc. NDSS. February, pp. 8-11, 2015.

Non-Patent Literature 18: J. Szurdi, B. Kocso, G. Cseh, J. Spring, M. Felegyhazi, and C. Kanich, "The Long "Taile" of Typosquatting Domain Names", Proc. USENIX Security Symposium, 2014.

Non-Patent Literature 19: Z. Li, S. Alrwais, Y. Xie, F. Yu, and X. Wang, "Finding the Linchpins of the Dark Web: a Study on Topologically Dedicated Hosts on Malicious Web Infrastructures", Proc. IEEE S&P, pp. 112-126, May 2013.

Non-Patent Literature 20: B. Rahbarinia, M. Balduzzi, and R. Perdisci, "Real-Time Detection of Malware Downloads via Large-Scale URL→File→Machine Graph Mining", Proc. ACM AsiaCCS, pp. 783-794, 2016.

SUMMARY

Technical Problem

Since attackers use malicious domain names having various features, it is not always possible to use all malicious domain names in attack countermeasures with the same condition.

For example, a description will be provided for a case where a domain name used in advertisement delivery on the internet is abused. In such a case, when a cache DNS server or an authoritative DNS server on a DNS communication path uses the domain name for the purpose of filtering, authorized advertisement delivery, which is not originally malicious, is also filtered. Therefore, in such a case, it is necessary to implement a countermeasure such as filtering after only malicious content is specified on a web communication path.

On the other hand, when malicious domain names generated for attack only is used, it is possible to implement a countermeasure to filter the domain names on the DNS communication path as is because an authorized service is not likely to be erroneously filtered. In such a case, when the malicious domain names are filtered, if the malicious domain names are uniformly filtered in units of second level domains without regard to the hierarchical structure of each domain name, it may have an influence on the authorized service. Furthermore, since attackers use new domain names one after another and stop using old malicious domain names, a countermeasure against each malicious domain name is invalidated with the passage of time.

As described above, an attack countermeasure method to be implemented, a countermeasure granularity, and a countermeasure period differ depending on the features of the malicious domain names. Consequently, it is necessary to appropriately determine attack countermeasures to be implemented for each malicious domain name.

However, in the related techniques for specifying malicious domain names (see Non-Patent Literatures 1 to 10) and the related techniques for clarifying the features of domain names (see Non-Patent Literatures 11 to 20), since all the techniques merely specify the malicious domain names, it is not possible to determine an attack countermeasure method to be implemented for each malicious domain name, a countermeasure granularity, and a countermeasure period.

For example, the technique disclosed in Non-Patent Literature 1 is a technique for extending a list of malicious domain names by focusing on the statistical features of character strings of the malicious domain names. The technique disclosed in Non-Patent Literature 2 is a technique for specifying malicious domain names based on WHOIS registration information of domain names. Furthermore, the technique disclosed in Non-Patent Literature 3 is a technique for specifying malicious domain names by focusing on an internet protocol (IP) address corresponding to a domain name and the features of domain names to which the corresponding IP address is common. Furthermore, the technique disclosed in Non-Patent Literature 4 is a technique for finding new malicious domain names by focusing on a time-series variation in the registration status of domain names in a public domain name list.

Furthermore, the technique disclosed in Non-Patent Literature 5 is a technique for determining the maliciousness of domain names by focusing on features in which a large number of malicious domain names are simultaneously registered with a domain name registration company. Furthermore, the technique disclosed in Non-Patent Literature 6 is a technique for finding malicious domain names by focusing on the co-occurrence of DNS queries sent from a plurality of infected terminals. The technique disclosed in Non-Patent Literature 7 is a technique for specifying malicious domain names by focusing on the traffic patterns of DNS queries sent from users.

In addition, the technique disclosed in Non-Patent Literature 8 is a technique in which malicious domain names are found on an authoritative DNS server by focusing on the patterns of DNS queries from a cache DNS server. The technique disclosed in Non-Patent Literature 9 is a technique in which malicious domain names are specified on a cache DNS server by observing DNS queries addressed to non-existing domain names. The technique disclosed in Non-Patent Literature 10 is a technique in which malicious domain names are found on a cache DNS server by focusing on the traffic patterns of observable DNS queries.

All these techniques disclosed in Non-Patent Literatures 1 to 10 have means for specifying malicious domain names, but have a problem in that it is not possible to determine countermeasures to be implemented for each malicious domain name and where and when the countermeasures are to be implemented.

Furthermore, in the technique disclosed in Non-Patent Literature 11, an attempt is made to clarify an attack technique that abuses advertisement delivery and to specify a domain name involved therein. Non-Patent. Literature 12 discloses a technique for specifying a domain name used in a content delivery network (CDN). In addition, Non-Patent Literature 13 proposes a method for finding new malicious domain names by focusing on the hierarchical structure of malicious domain names. Furthermore, Non-Patent Literature 14 proposes a method for specifying a malicious domain name, which is generated by an attacker through a domain generation algorithm. (DGA: domain name generation algorithm), by using the features and the frequency of appearance of a character string of the malicious domain name.

Furthermore, Non-Patent Literature 15 proposes a method for estimating a change in owner information of domain names from a DNS traffic log. In the technology disclosed in Non-Patent Literature 16, an attempt is made to specify a domain name called a sinkhole and re-acquired by a security organization or the like among malicious domain names originally owned by an attacker. In the technology disclosed in Non-Patent Literature 17, an attempt is made to specify a domain name called parking, which is not actually used but used for advertisement display.

In addition, Non-Patent Literature 18 proposes a technique for specifying malicious domain names accessible when a famous domain name is mistyped. Non-Patent Literature 19 discloses a method for specifying domain names used in a service called dynamic DNS in which setting can be dynamically changed. In addition, Non-Patent Literature 20 discloses a method for specifying domain names that can be acquired and maintained free of charge.

However, these techniques disclosed in Non-Patent Literatures 11 to 20 attempt to clarify the features of respective malicious domain names, but do not determine countermeasures for the malicious domain names.

In this regard, the present invention has been made to solve the aforementioned problems, and an object of the present invention is to provide an attack countermeasure determination apparatus, an attack countermeasure determination method, and an attack countermeasure determination program, by which it is possible to objectively determine an attack countermeasure technique for each domain name with respect to attacks based on malicious domain names.

Solution to Problem

An attack countermeasure determination apparatus includes: an input unit configured to receive an arbitrary domain name as input, and acquire setting information corresponding to the domain name, registration information corresponding to the domain name, and external information corresponding to an address corresponding to the domain name, as feature information on the domain name; an attack countermeasure determination unit configured to specify a pre-designated category for the domain name on the basis of the feature information, and determine, in a stepwise manner, an attack countermeasure against the domain name in accordance with the specified category; and an attack countermeasure information output unit configured to output attack countermeasure information corresponding to the attack countermeasure.

Advantageous Effects of Invention

In accordance with the present invention, it is possible to objectively determine an attack countermeasure technique for each domain name with respect to attacks based on malicious domain names.

BRIEF DESCRIPTION OF DRAWINGS

FIG. 2 is a diagram illustrating an example of a domain name input to a domain name input unit illustrated in FIG. 1.

FIG. 3 is a diagram for explaining an example of setting information corresponding to the domain name input to the domain name input unit illustrated in FIG. 1.

FIG. 4 is a diagram illustrating an example of registration information corresponding to the domain name input to the domain name input unit illustrated in FIG. 1.

FIG. 5 is a diagram illustrating an example of external information corresponding to an IP address corresponding to the domain name input to the domain name input unit illustrated in FIG. 1.

FIG. 6 is a diagram illustrating an example of a result obtained when an attack countermeasure means determination unit illustrated in FIG. 1 specifies and assigns a corresponding category to each domain name input to the domain name input unit.

FIG. 9 is a diagram illustrating an example in which the attack countermeasure means determination unit illustrated in FIG. 1 sets attack countermeasure means for a malicious domain name belonging to each category.

FIG. 10 is a diagram illustrating an example in which an attack countermeasure granularity determination unit illustrated in FIG. 1 sets an attack countermeasure granularity for the malicious domain name belonging to each category.

FIG. 11 is a diagram illustrating an example in which an attack countermeasure expiration date determination unit illustrated in FIG. 1 sets an attack countermeasure expiration date for the malicious domain name belonging to each category.

FIG. 12 is a diagram illustrating an example in which an attack countermeasure information output unit illustrated in FIG. 1 determines an attack countermeasure.

FIG. 13 is a diagram illustrating an example of a place where the attack countermeasure means is implemented using attack countermeasure information output by the attack countermeasure information output unit illustrated in FIG. 1.

FIG. 14 is a diagram illustrating an example of output information by the attack countermeasure information output unit illustrated in FIG. 1.

FIG. 15 is a diagram illustrating an example of output information by the attack countermeasure information output unit illustrated in FIG. 1.

FIG. 16 is a diagram illustrating an example of output information by the attack countermeasure information output unit illustrated in FIG. 1.

FIG. 17 is a diagram illustrating an example of output information by the attack countermeasure information output unit illustrated in FIG. 1.

DESCRIPTION OF EMBODIMENTS

Figure 1:
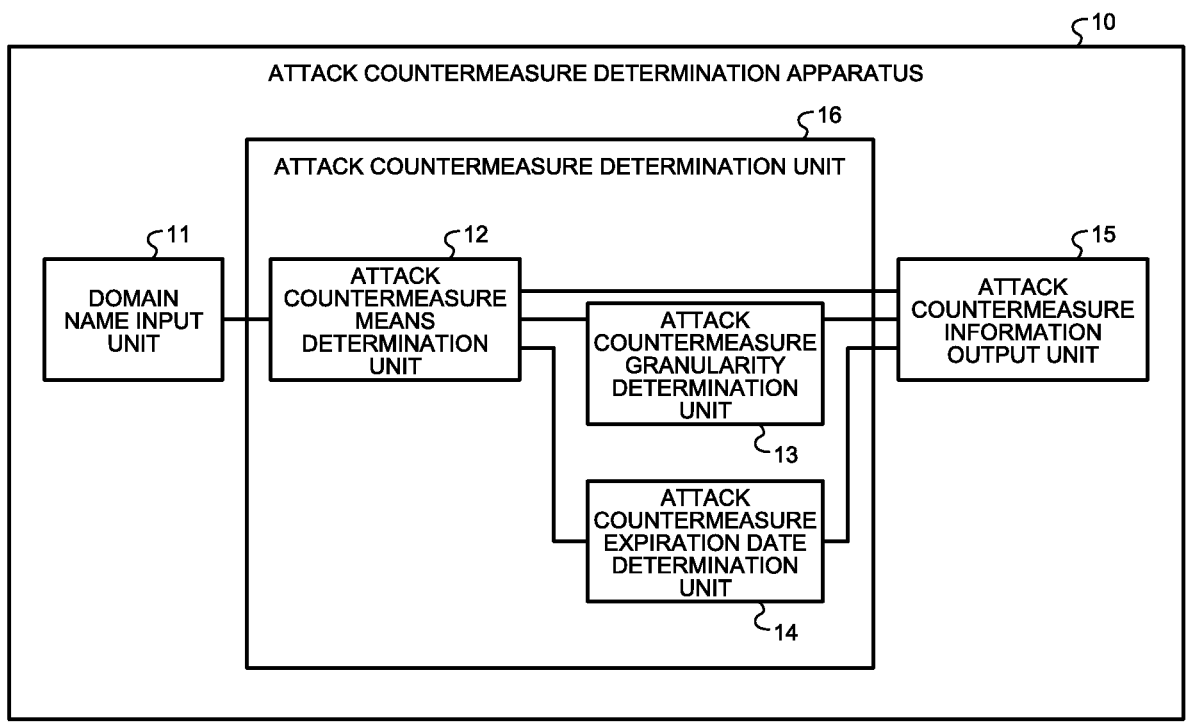
FIG. 1 is a schematic diagram illustrating a schematic configuration of an attack countermeasure determination apparatus according to an embodiment.

Hereinafter, with reference to the drawings, an embodiment of the present invention will be described in detail. The present invention is not limited to the embodiment. In the description of the drawings, the same reference numerals are assigned to the same elements.

(Embodiment)

First, a schematic configuration, and the flow and specific example of an evaluation process of an attack countermeasure determination apparatus according to an embodiment will be described. FIG. 1 is a schematic diagram illustrating a schematic configuration of the attack countermeasure determination apparatus according to the embodiment. As illustrated in FIG. 1, an attack countermeasure determination apparatus 10 has a domain name input unit 11 (input unit), an attack countermeasure determination unit 16, and an attack countermeasure information output unit 15.

The domain name input unit 11 receives input of any domain name and acquires feature information on the domain name. The domain name input unit 11 acquires setting information corresponding to the domain name, registration information corresponding to the domain name, and external information corresponding to an IP address corresponding to the domain name, as the feature information on the domain name.

The attack countermeasure determination unit 16 specifies a pre-designated category for the domain name on the basis of the feature information acquired by the domain name input unit 11, and determines, in a stepwise manner, an attack countermeasure against the domain name in accordance with the specified category. The attack countermeasure determination unit 16 sequentially determines attack countermeasure means, an attack countermeasure granularity, and an expiration date of the attack countermeasure. The attack countermeasure determination unit 16 has an attack countermeasure means determination unit 12, an attack countermeasure granularity determination unit 13, and an attack countermeasure expiration date determination unit 14.

The attack countermeasure means determination unit 12 specifies the pre-designated category for the input domain name on the basis of the feature information on the domain name acquired by the domain name input unit 11. Each domain name has a corresponding category designated in advance.

Then, the attack countermeasure means determination unit 12 determines attack countermeasure means for the domain name by using information of the category specified for the domain name. The attack countermeasure means determination unit 12 specifies whether the domain name is a domain name created by abusing an authorized service (hereinafter, referred to as an abused domain name) or a domain name created for an attack only (hereinafter, referred to as an attack-specific domain name) in accordance with the category specified for the domain name. Whether the domain name corresponds to the features of the abused domain name or the features of the attack-specific domain name is set for each category in advance.

When the domain name is specified as being the abused domain name, the attack countermeasure means determination unit 12 determines to apply the attack countermeasure means of a "web communication level". On the other hand, when the domain name is specified as being the attack-specific domain name, the attack countermeasure means determination unit 12 determines to apply attack countermeasure means such as filtering using the domain name at a "DNS communication level". In addition, when the domain name corresponds to a category corresponding to both the abused domain name and the attack-specific domain name, the attack countermeasure means determination unit 12 preferentially determines attack countermeasure means for the abused domain name with respect to the domain name in order to prevent an authorized service from being blocked.

The attack countermeasure granularity determination unit 13 specifies the operational features of the domain name from the state of an upper domain name or a lower domain name of the domain name or the state of content present under the domain name by using the information of the category specified for the input domain name, and determines an attack countermeasure granularity for the domain name. In other words, the attack countermeasure granularity determination unit 13 analyzes the features of the abused domain name or the attack-specific domain name belonging to each category, and determines the granularity of information to be used in an attack countermeasure, on the basis of each category. For each category, an attack countermeasure granularity corresponding to each category is set in advance.

The attack countermeasure expiration date determination unit 14 determines the expiration date of the attack countermeasure against the domain name by using the information of the category specified for the input domain name. For example, the attack countermeasure expiration date determination unit 14 analyzes the features of the abused domain name belonging to each category, and determines the expiration date of the information to be used in the attack countermeasure, on the basis of each category. In other words, the attack countermeasure expiration date determination unit 14 uses information of a category assigned to each domain name, estimates a time to registration termination or use termination of each domain name based on information of a registration period or a use period of each domain name belonging to each category, and sets the estimated time as the expiration date of the attack countermeasure.

For each category, an attack countermeasure expiration date corresponding to each category is set in advance. When the expiration date has passed, the attack countermeasure determination apparatus 10 may perform again the process of acquiring the feature information, the process of specifying the category, and the process of determining the attack countermeasure in a stepwise manner with respect to the domain name, and update attack countermeasure information on the domain name.

The attack countermeasure information output unit 15 outputs attack countermeasure information corresponding to each attack countermeasure. The attack countermeasure information output unit 15 generates attack countermeasure information based on the attack countermeasure means determined by the attack countermeasure means determination unit 12, the attack countermeasure granularity determined by the attack countermeasure granularity determination unit 13, and the attack countermeasure expiration date determined by the attack countermeasure expiration date determination unit 14, with respect to the domain name input to the domain name input unit 11. Then, the attack countermeasure information output unit 15 outputs the attack countermeasure information determined for each domain name to an output destination in accordance with each implementation place where the attack countermeasure is to be implemented.

In such a case, the attack countermeasure determination apparatus 10 stores therein in advance information indicating the type of a server apparatus or the like of the output destination located at the implementation place of the attack countermeasure. The attack countermeasure information output unit 15 refers to the information and outputs the attack countermeasure information in a data format corresponding to the type or the like of the server apparatus of the output destination.

Furthermore, the attack countermeasure information output unit 15 may add the expiration date, which has been determined by the attack countermeasure expiration date determination unit 14, and information, which instructs to discard the attack countermeasure information when the expiration date passes, to the attack countermeasure information, and output the attack countermeasure information to the output destination. Accordingly, the server apparatus of the output destination discards the attack countermeasure information when the expiration date passes. Furthermore, after discarding the attack countermeasure information, the server apparatus of the output destination may request the attack countermeasure determination apparatus 10 to transmit new attack countermeasure information.

As described above, in accordance with the attack countermeasure determination apparatus according to the present embodiment, it is possible to objectively determine an attack countermeasure technique for each domain name and to output or update attack countermeasure information capable of implementing an attack countermeasure without blocking an authorized service. Subsequently, the process of each element will be described in detail.

[Process of Domain Name Input Unit]

First, the process of the domain name input unit 11 will be described. FIG. 2 is a diagram illustrating an example of the domain name input to the domain name input unit 11 illustrated in FIG. 1. As illustrated in FIG. 2, the domain name input unit 11 correlates a serial number to the input domain name. For example, the serial number "1" of FIG. 2 indicates that a domain name, "example.com", is used as input.

FIG. 3 is a diagram for explaining an example of the setting information corresponding to the domain name input to the domain name input unit 11 illustrated in FIG. 1. In FIG. 3, items such as a serial number, a domain name, an A record, an NS record, and an SOA record are set. Among the items, the A record, the NS record, the SOA record, and the like are setting information corresponding to each domain name. The domain name input unit 11 receives the setting information such as the A record, the NS record, and the SOA record by using a DNS protocol on a cache DNS server disposed in a network within a certain organization.

Specifically, the row of the serial number "1" of FIG. 3 will be described. As indicated in the row of the serial number "1", for the domain name, "example.com", an IP address "192.0.2.2" was set as the A record at the time of 00:00:00 on Jan. 1, 2017, "ns1.example.com" was set as the NS record, and "ns1.example.com. nobody.localhost.42 86400 43200 604800 10800" was set as the SOA record. Therefore, for the domain name, "example.com", the domain name input unit 11 acquires the setting information such as the aforementioned A record, "192.0.2.2", NS record, "ns1.example.com", and SOA record "ns1.example.com. nobody.localhost.42 86400 43200 604800 10800" on the cache DNS server by using the DNS protocol.

Next, a description will be provided for an example in which from the input domain name, the domain name input unit 11 acquires the registration information corresponding to the domain name. FIG. 4 is a diagram illustrating an example of the registration information corresponding to the domain name input to the domain name input unit 11 illustrated in FIG. 1. In FIG. 4, items, such as a serial number, a domain name, a WHOIS server name, an NS server name, a domain name registration date, a domain name update date, and a domain name expiration date, are correlated. Among the items, the WHOIS server name, the NS server name, the domain name registration date, the domain name update date, the domain name expiration date, and the like are registration information corresponding to each domain name. The domain name input unit 11 acquires the registration information corresponding to each domain name by using a WHOIS protocol, for example.

Specifically, in the row of the serial number "1" of FIG. 4, for the domain name, "example.com", it is registered that the WHOIS server name is "whois.example.com", the NS server name is "ns1.example.com", the domain name registration date is "January 1, 2001", the domain name update date is "January 1, 2016", and the domain name expiration date is "January 1, 2017". Therefore, for the domain name "example.com", the domain name input unit 11 acquires the WHOIS server name "whois.example.com", the NS server name "ns1.example.com", the domain name registration date "January 1, 2001", the domain name update date "January 1, 2016", and the domain name expiration date "January 1, 2017" by using the WHOIS protocol.

Next, a description will be provided for an example in which from the input domain name, the domain name input unit 11 acquires the external information corresponding to the IP address corresponding to the domain name. FIG. 5 is a diagram illustrating an example of the external information corresponding to the IP address corresponding to the domain name input to the domain name input unit 11 illustrated in FIG. 1. In FIG. 5, items, such as an address prefix belonging to the IP address, an autonomous system (AS) number, an owner organization name, a country, a regional internet registry (RIR), and an address allocation date, are set as the external information of the IP address. The domain name input unit 11 acquires the external information of the IP address by using information disclosed by each RIR and a public service such as MaxMind's GeoIP (registered trademark), in addition to using the WHOIS protocol.

Specifically, in the row of the serial number "1" of FIG. 5, for the IP address "192.0.2.2", it is set that the address prefix is "192.0.2.0/24", the AS number is "64498", the owner organization name is "TEST-NET-1", the country is "US", the RIR is "ARIN", and the address allocation date is "January 1, 2001". Therefore, for the IP address "192.0.2.2", the domain name input unit 11 acquires the address prefix "192.0.2.0/24", the AS number, "64498", the owner organization name "TEST-NET-1", the country "US", the RIR "ARIN", and the address allocation date "January 1, 2001" by using the WHOIS protocol, the information disclosed by each RIP, and the public service such as MaxMind's GeoIP.

[Process of Specifying Category Attack Countermeasure Means Determination Unit]

Next, the process of the attack countermeasure means determination unit 12 will be described. First, a description will be provided for the process in which the attack countermeasure means determination unit 12 specifies a category corresponding to the input domain name. The attack countermeasure means determination unit 12 specifies the category corresponding to the domain name by using the feature information on the domain name, which has been acquired by the domain name input unit 11, that is, the setting information corresponding to the domain name, the registration information corresponding to the domain name, and the external information corresponding to the IP address corresponding to the domain name. As described above, the corresponding category is designated to each domain name in advance in accordance with the feature information. Furthermore, for each category, attack countermeasure means, an attack countermeasure granularity, and an attack countermeasure expiration date to be described later are set in advance.

FIG. 6 is a diagram illustrating an example of a result obtained when the attack countermeasure means determination unit 12 illustrated in FIG. 1 specifies and assigns the corresponding category to each domain name input to the domain name input unit 11. In FIG. 6, the category includes "advertisement", "CDN", "Web hosting", "DGA", "re-registration", "sinkhole", "parking", "typosquatting", "no-content", "dynamic DNS", "free", and "domain name hosting". Of course, the category is not limited thereto. In order to specify the belonging status of each domain name to each category, it is sufficient if the attack countermeasure means determination unit 12 uses a known technique, or performs matching or the like with a domain name list, which belongs to each category independently collected, in each category.

Hereinafter, the domain name belonging to the category of FIG. 6 will be described. First, the domain name belonging to the category "advertisement" is a domain name associated with an on-line advertisement delivery system on the web. The attack countermeasure means determination unit 12 specifies the domain name of the category "advertisement" by performing matching using Easylist (http:// easylist.to/) which is a known advertisement provider domain name list (for details, see Non-Patent Literature 11).

The domain name belonging to the category "CDN" is a domain name used in a content delivery network (CDN), which is a distributed content delivery infrastructure on the web. The attack countermeasure means determination unit 12 specifies the domain name of the category "CDN" by confirming whether the IP address corresponding to the domain name is included in an address zone owned by a CDN provider (for details, see Non-Patent Literature 12). Furthermore, the attack countermeasure means determination unit 12 refers to setting information of a CNAME record of the domain name and confirms whether the domain name of the CDN provider has been set. In such a case, the attack countermeasure means determination unit 12 refers to the setting information and the registration information corresponding to the domain name, and the external information corresponding to the IP address, which have been acquired by the domain name input unit 11, and specifies a domain name to be assigned the category "CDN".

Figure 7:
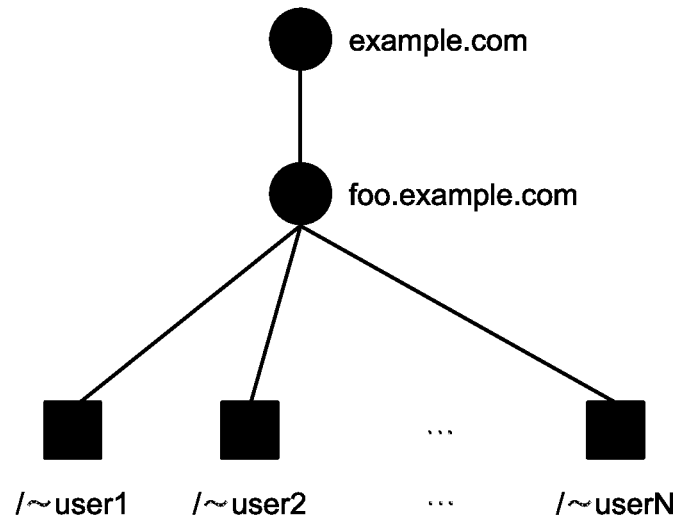
FIG. 7 is a diagram illustrating an example of a hierarchical structure in Web hosting.

The domain name belonging to the category "Web hosting" is a domain name being operated by using a hosting service or a cloud service. FIG. 7 is a diagram illustrating an example of a hierarchical structure in the Web hosting. For example, as illustrated in FIG. 7, when there are a plurality of URLs (foo.example.com/~user1, foo.example.com/~user2, . . . , foo.example.com/~userN) under a domain name "foo.example.com", it can be said that the domain name "foo.example.com" is a domain name used in the "Web hosting". The attack countermeasure means determination unit 12 specifies a domain name, which is used in the "Web hosting", by extracting the presence status of content under each domain name by using a search engine or the like (for details, see Non-Patent Literature 13).

The domain name belonging to the category "DGA" is a domain name generated using the domain generation algorithm (DGA: domain name generation algorithm) by an attacker. The attack countermeasure means determination unit 12 focuses on the features of the domain name generated using the DGA, which are different from those of a domain name in which a character string is normally used, and specifies the domain name of the category "DGA" by using a technique of specifying a domain name on the basis of the features or the frequency of appearance of the character string (for details, see Non-Patent Literature 14).

The domain name belonging to the category "re-registration" is a domain name re-registered after a domain name originally owned by another person is expired. The attack countermeasure means determination unit 12 continuously receives the registration information of WHOIS data of each domain name, and specifies the domain name of the category "re-registration" by using a technique of observing a change in owner information or a technique of estimating a change in owner information from a change in a DNS traffic log (for details, see Non-Patent Literature 15).

The domain name belonging to the category "sinkhole" is a domain name reacquired by a security organization or the like for the purpose of observation among malicious domain names originally owned by an attacker. The attack countermeasure means determination unit 12 refers to the information of the NS record, which is the setting information of the domain name, and specifies the domain name of the category "sinkhole" by using a technique of performing matching with previously received known sinkhole information (for details, see Non-Patent Literature 16).

The domain name belonging to the category "parking" is a domain name which is not actually used but used for advertisement display. The attack countermeasure means determination unit 12 refers to the information of the NS record, which is the setting information of the domain name, and specifies the domain name of the category "parking" by using a technique of performing matching with previously received known parking information (for details, see Non-Patent Literature 17).

The domain name belonging to the category "typosquatting" is a malicious domain name accessible when a famous domain name is mistyped. The attack countermeasure means determination unit 12 defines a model (addition, deletion, replacement, exchange, and the like of a character string) in which mistyping occurs, and specifies the domain name or the category "typosquatting" by using a technique of inspecting whether it is a malicious domain name accessible when a famous domain name is mistyped (for details, see Non-Patent Literature 18).

The domain name belonging to the category ""no-content" is a domain name having no web content or the like when it is accessed or a domain name having no sub-domain name or URI, under each domain name. The attack countermeasure means determination unit 12 specifies the domain name belonging to the category "no-content" by using a technique of performing web access to a domain name or a technique of performing search using a search engine or the like.

The domain name belonging to the category "dynamic DNS" is a domain name using a dynamic DNS service in which setting can be dynamically changed. When the dynamic DNS service is used, a user can register any sub-domain name and easily associate any IP address with the sub-domain name. The attack countermeasure means determination unit 12 receives a domain name list of a known dynamic DNS provider, and specifies the domain name of the category "dynamic DNS" by using a technique of matching the domain name list with the domain name (for details, see Non-Patent Literature 19).

The domain name belonging to the category "free" is a domain name that can be acquired and maintained by a user free of charge. The attack countermeasure means determination unit 12 refers to the information of the NS record, which is the setting information of the domain name, and specifies the domain name of the category "free" by using a technique of performing matching with previously received known free domain name provider (for details, see Non-Patent Literature 20).

The domain name belonging to the category "domain name hosting" is a domain name being operated by using the hosting service or the cloud service similarly to the "Web hosting", but is different from the "Web hosting" in that a sub-domain name can be created under the domain name.

Figure 8:
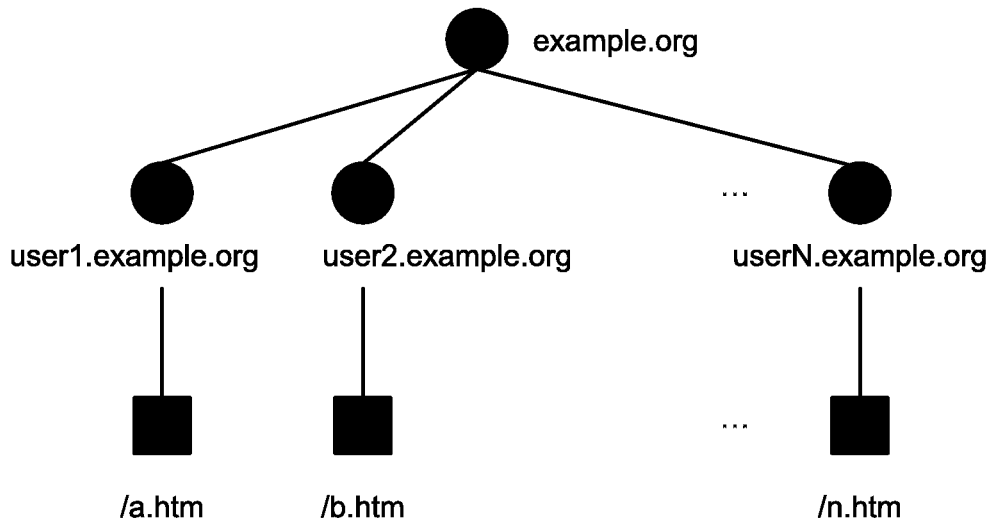
FIG. 8 is a diagram illustrating an example of a hierarchical structure in domain name hosting.

FIG. 8 is a diagram illustrating an example of a hierarchical structure in the domain name hosting. For example, as illustrated in FIG. 8, when there are a plurality of sub-domain names (user1.example.org, user2.example.org, . . . , userN.example.org) under a domain name "example.org", it can be said that the domain name "example.org" is a domain name used in the "domain name hosting". The attack countermeasure means determination unit 12 specifies the domain name of the category "domain name hosting" by using a technique of extracting the presence status of content under each domain name by means of a search engine or the like.

[Process of Determining Attack Countermeasure Means by Attack Countermeasure Means Determination Unit]

Subsequently, a description will be provided for the process in which the attack countermeasure means determination unit 12 determines the attack countermeasure means for the input domain name.

FIG. 9 is a diagram illustrating an example in which the attack countermeasure means determination unit 12 illustrated in FIG. 1 sets the attack countermeasure means for the malicious domain name belonging to each category. The attack countermeasure means determination unit 12 analyzes the features of the malicious domain name belonging to each category, and further classifies the categories into two types of "abuse of authorized service" corresponding to the malicious domain name and "attack only" corresponding to the attack-specific domain name. Whether the categories correspond to the features of the "abuse of authorized service" or the features of the "attack only" is set for each category in advance.

The "abuse of authorized service" is a category in which a malicious domain name is created by abusing a service or the like originally prepared for providing an authorized service, and the "advertisement", the "CDN", and the "The Web hosting" of the above categories correspond to the "abuse of authorized service". When the attack countermeasure means such as filtering using the domain name at the "DNS communication level" is applied to the malicious domain name corresponding to the "abuse of authorized service", it is highly likely that the authorized service will also be blocked. Consequently, the attack countermeasure means determination unit 12 determines to apply the attack countermeasure means of the "web communication level" using additional information of URL or content to the malicious domain name corresponding to the "abuse of authorized service".

On the other hand, the "attack only" is a category to which a malicious domain name newly prepared for an attack by an attacker corresponds, and the "DGA", the "re-registration", the "sinkhole", the "parking", the "typosquatting", the "no-content", the "dynamic DNS", the "free", and the "domain name hosting" of the above categories correspond to the "attack only". The attack countermeasure means determination unit 12 determines to apply the attack countermeasure means such as filtering using the domain name at the "DNS communication level" to the malicious domain name corresponding to the "attack only". However, when a certain domain name corresponds to the category of both the "abuse of authorized service" (for example, the Web hosting) and the "attack only" (for example, the typosquatting), the attack countermeasure means determination unit 12 gives priority to the attack countermeasure means of the "abuse of authorized service" in order to prevent the authorized service from being blocked.

(Process of Attack Countermeasure Granularity Determination Unit)

Next, the process of the attack countermeasure granularity determination unit 13 will be described. FIG. 10 is a diagram illustrating an example in which the attack countermeasure granularity determination unit 13 illustrated in FIG. 1 sets the attack countermeasure granularity for the malicious domain name belonging to each category. The attack countermeasure granularity determination unit 13 analyzes the features of the malicious domain name belonging to each category, and determines the granularity of information to be used in an attack countermeasure, on the basis of each category. For the "abuse of authorized service" and the "attack only" which are the features of the domain name, the granularity of information to be used is set in advance. Consequently, the attack countermeasure determination apparatus 10 can specify the category of the domain name according to each rule determined in advance, thereby determining the features of the domain name. Moreover, the attack countermeasure determination apparatus 10 can set the attack countermeasure granularity of the domain name in accordance with the features of the domain name.

Specifically, for a domain name specified in a category having the features of the "abuse of authorized service", the information of the granularity of URL or content is set in advance to be used. Consequently, similarly to the attack countermeasure means determination unit 12, the attack countermeasure granularity determination unit 13 determines that the malicious domain name using the "advertisement", the "CDN", and the "Web hosting" having the features of the "abuse of authorized service" uses the information of the granularity of URL or content. As a consequence, the attack countermeasure determination apparatus 10 can cope with an attack on only a specific attack advertisement or attack page and prevent an authorized service from being blocked.

On the other hand, for a category having the features of the "attack only", the information of the granularity is set to be used in accordance with the hierarchical structure of domain names that may be present above or below the domain name. In other words, for the category having the features of the "attack only", the attack countermeasure granularity determination unit 13 determines an attack countermeasure granularity on the basis of a rule that takes into account the hierarchical structure of the domain names that may be present above or below the domain name.

Specifically, for the "dynamic DNS", the "free", and the "domain name hosting" of the categories corresponding to the "attack only", it is set to use "information of granularity of fully qualified domain name (FQDN)" of the domain name. This is because, for the "dynamic DNS", the "free", and the "domain name hosting" of the categories corresponding to the "attack only", other domain names with a purpose different from that of the domain name are highly likely to be present above or below the domain name. Consequently, in such a case, the attack countermeasure granularity determination unit 13 determines to use the "information of granularity of fully qualified domain name (FUN)" of the domain name. As a consequence, the apparatus of the output destination can implement an attack countermeasure without having an influence on the other domain names with a different purpose.

Furthermore, for the "DGA", the "re-registration", the "sinkhole", the "parking", the "typosquatting", and the "no-content", other than the above-mentioned categories, of the categories corresponding to the "attack only", it is set to use "information of granularity of a second level domain name (2LD)". In a service that provides the "dynamic DNS", a user can create any sub-domain name under a second level domain name of a service provider. In such a case, when a countermeasure is implemented with the granularity of the second level domain name, it is highly likely that other users using the "dynamic DNS" service will be blocked. Consequently, in such a case, the attack countermeasure granularity determination unit 13 determines to use the "information of granularity of a second level domain name (2LD)" with respect to the "DGA", the "re-registration", the "sinkhole", the "parking", the "typosquatting", and the "no-content", other than the aforementioned categories, of the categories corresponding to the "attack only".

[Process of Attack Countermeasure Expiration Date Determination Unit]

Next, the process of the attack countermeasure expiration date determination unit 14 will be described. FIG. 11 is a diagram illustrating an example in which the attack countermeasure expiration date determination unit 14 illustrated in FIG. 1 sets the attack countermeasure expiration date for the malicious domain name belonging to each category. The attack countermeasure expiration date determination unit 14 analyzes the features of the malicious domain name belonging to each category, and determines the expiration date of the information to be used in the attack countermeasure, on the basis of each category. In addition, as described above, for each category, the expiration date of the attack countermeasure corresponding to each category is set in advance.

For example, of the categories, for the "DGA", the "dynamic DNS", and the "free" in which an attacker can easily acquire a large number of new domain names with low or no cost, the expiration date is set as a "short period" on the basis of information indicating that the attacker is less likely to use the same domain name for a long period of time (for details, see Non-Patent Literature 14, Non-Patent Literature 19, and Non-Patent Literature 20). Therefore, the attack countermeasure expiration date determination unit 14 sets the expiration date as the "short period" for the "DGA", the "dynamic DNS", and the "free".

On the other hand, for the categories "advertisement", "CDN", "Web hosting", "re-registration", "sinkhole", "parking", "typosquatting", "no-content", and "domain name hosting", other than the aforementioned categories, the expiration date is set as a "long period". Consequently, the attack countermeasure expiration date determination unit 14 sets the expiration date as the "long period" for the categories "advertisement", "CDN", "Web hosting", "re-registration", "sinkhole", "parking", "typosquatting", "no-content", and "domain name hosting".

Furthermore, the attack countermeasure expiration date determination unit 14 can set the expiration date in accordance with update frequency at an actual countermeasure place. For example, the attack countermeasure expiration date determination unit 14 sets 24 hours as the "short period" and 14 days as the "long period".

[Process of Attack Countermeasure Information Output Unit]

Next, the process of the attack countermeasure information output unit 15 will be described. FIG. 12 is a diagram illustrating an example in which the attack countermeasure information output unit 15 illustrated in FIG. 1 determines the attack countermeasure. FIG. 12 illustrates an example in which the attack countermeasure is determined for the domain name input to the domain name input unit 11 and illustrated in FIG. 2.

The attack countermeasure information output unit 15 determines the attack countermeasure against the domain name input to the domain name input unit 11, on the basis of the "attack countermeasure means", the "attack countermeasure granularity", and the "attack countermeasure information expiration date", which have been determined by the attack countermeasure means determination unit 12, the attack countermeasure granularity determination unit 13, and the attack countermeasure expiration date determination unit 14, respectively.

For example, the category of the malicious domain name "example.com" illustrated in the serial number "1" of FIG. 12 is the "no-content" (see the serial number "1" of FIG. 6). Therefore, the attack countermeasure information output unit 15 sets the "DNS communication level" (see the serial number "9" of FIG. 9) as the attack countermeasure means, the "2LD information" (see the serial number "9" of FIG. 10) as the attack countermeasure granularity, and the "long period" (see the serial number "9" of FIG. 11) as the attack countermeasure information expiration date.

Then, the attack countermeasure information output unit 15 outputs the attack countermeasure determined for each domain name to an output destination corresponding to each execution place of the attack countermeasure. The attack countermeasure information output unit 15 outputs the attack countermeasure determined for each domain name to a place where the attack countermeasure means is implemented. FIG. 13 is a diagram illustrating an example of the place where the attack countermeasure means is implemented using the attack countermeasure information output by the attack countermeasure information output unit 15 illustrated in FIG. 1.

As the example of the place where the attack countermeasure means is implemented, a "cache DNS server" is illustrated in the serial number "1" of FIG. 13. FIG. 13 illustrates that the "filtering of the DNS communication level" can be performed in the "cache DNS server". As an example of a place where the attack countermeasure information is applied, an "authoritative DNS server" is illustrated in the serial number "2" of FIG. 13. FIG. 13 illustrates that the "filtering of the DNS communication level or administrator notification" can be performed in the "authoritative DNS server". The administrator notification is an example in which an administrator of the malicious domain name is notified to implement a countermeasure.

Furthermore, as the example of the place where the attack countermeasure information is applied, a "web server" is illustrated in the serial number "3" of FIG. 13. FIG. 13 illustrates that the "filtering of the web communication level or administrator notification" can be performed in the "web server". Furthermore, as the example of the place where the attack countermeasure information is applied, a "security appliance" is illustrated in the serial number "4" of FIG. 13. FIG. 13 illustrates that the "filtering of the DNS communication level or the web communication level" can be performed in the "security appliance". The list of the output destinations of the attack countermeasure information illustrated in FIG. 13 is created in advance, and the attack countermeasure determination apparatus 10 stores therein the list of the output destinations of the attack countermeasure information illustrated in FIG. 13.

FIG. 14 is a diagram illustrating an example of output information by the attack countermeasure information output unit 15 illustrated in FIG. 1. FIG. 14 illustrates attack countermeasure information for the "cache DNS server" according to the input of the domain name illustrated in FIG. 2 to the domain name input unit 11. The apparatus of the output destination can implement a countermeasure to filter the malicious domain name on the "cache DNS server" by using the output information as illustrated in FIG. 14.

FIG. 15 is a diagram illustrating an example of the output information by the attack countermeasure information output unit 15 illustrated in FIG. 1. FIG. 15 illustrates attack countermeasure information for the "authoritative DNS server" of a top level domain of ".example" according to the input of the domain name illustrated in FIG. 2 to the domain name input unit 11. The authoritative DNS server can cope with only domain names present under the authoritative DNS server. Therefore, as illustrated in FIG. 15, the attack countermeasure information output unit 15 outputs only a domain name having the top level domain of ".example" to the authoritative DNS server. Based on the output information, the authoritative DNS server of ".example" can prevent an attack from occurring by, for example, implementing a countermeasure such as filtering of communication related to the domain name.

FIG. 16 is a diagram illustrating an example of the output information by the attack countermeasure information output unit 15 illustrated in FIG. 1. FIG. 16 illustrates attack countermeasure information for the "web server" with "webhosting.example" according to the input of the domain name illustrated in FIG. 2 to the domain name input unit 11. The web server can cope with only content on its own server. Therefore, as illustrated in FIG. 16, the attack countermeasure information output unit 15 outputs only information including content present under the "webhosting.example" to the web server.

FIG. 17 is a diagram illustrating an example of the output information by the attack countermeasure information output unit 15 illustrated in FIG. 1. FIG. 17 illustrates attack countermeasure information for the "security appliance" according to the input of the domain name illustrated in FIG. 2 to the domain name input unit 11. The "security appliance" can handle both the DNS communication level and the web communication level. Therefore, as illustrated in FIG. 17, the attack countermeasure information output unit 15 outputs information including both the DNS communication level and the web communication level, as the attack countermeasure information for the "security appliance".

[Processing Procedure of Attack Countermeasure Determination Process]

Figure 18:
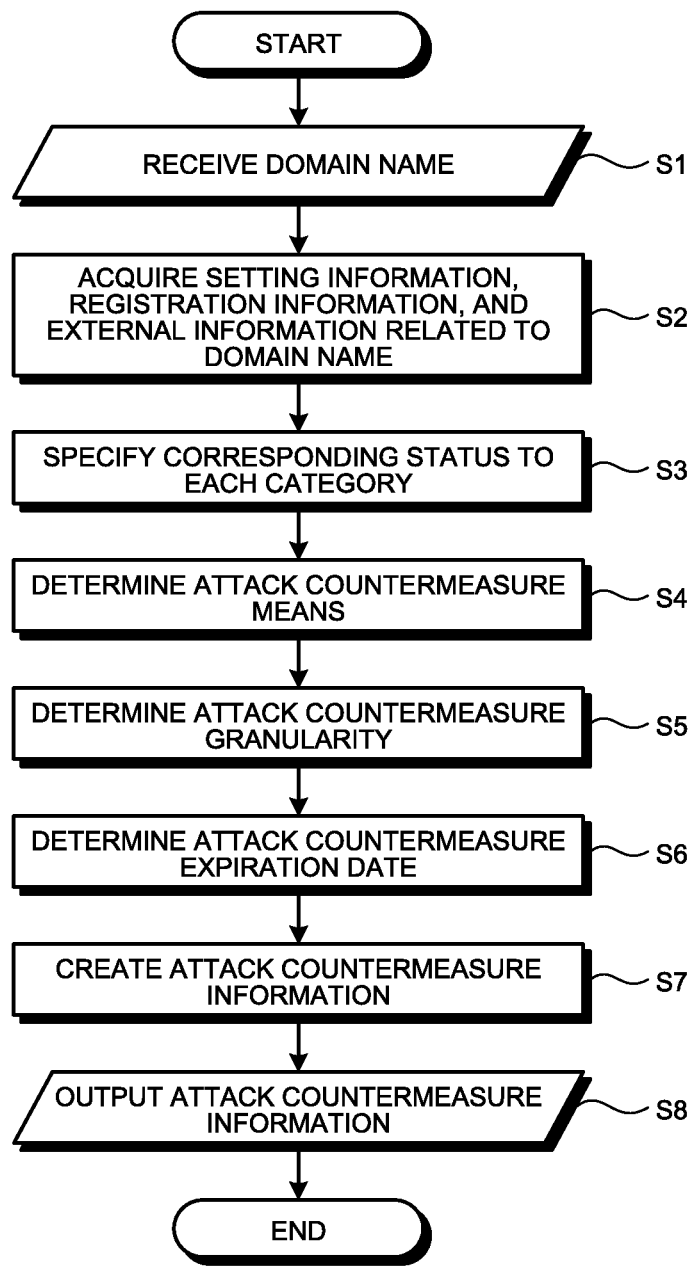
FIG. 18 is a flowchart illustrating a processing procedure of an attack countermeasure determination process of the attack countermeasure determination apparatus according to the embodiment.

Next, the attack countermeasure determination process of the attack countermeasure determination apparatus 10 will be described. FIG. 18 is a flowchart illustrating the processing procedure of the attack countermeasure determination process of the attack countermeasure determination apparatus 10 according to the embodiment.

First, when the input of the domain name as illustrated in FIG. 2 is received (step S1), the domain name input unit 11 acquires setting information, registration information, and external information corresponding to an IP address, which are related to the domain name, from the domain name (step S2).

Subsequently, the attack countermeasure means determination unit 12 specifies a corresponding status to each category from the domain name (step S3). Then, the attack countermeasure means determination unit 12 determines the attack countermeasure means against the domain name in accordance with the category specified at step S3 (step S4).

The attack countermeasure granularity determination unit 13 determines the attack countermeasure granularity for the domain name (step S5). Then, the attack countermeasure expiration date determination unit 14 determines the attack countermeasure expiration date for the domain name (step S6). Subsequently, the attack countermeasure information output unit 15 creates the attack countermeasure information for the domain name (step S7). Based on the attack countermeasure means, the attack countermeasure granularity, and the attack countermeasure expiration date determined in the processes of step S3 to step S6, the attack countermeasure information output unit 15 creates the attack countermeasure information in a data format corresponding to the type of the server apparatus of the output destination located at each implementation place of the attack countermeasure. Then, the attack countermeasure information output unit 15 outputs the attack countermeasure information corresponding to each implementation place of the attack countermeasure (step S8), and ends the process.

[Effect of Embodiment]

As described above, the attack countermeasure determination apparatus 10 according to the embodiment, specifies the pre-designated category for the domain name on the basis of the acquired feature information, determines, in a stepwise manner, the attack countermeasure against the domain name in accordance with the specified category, and outputs the attack countermeasure information. Consequently, in accordance with the attack countermeasure determination apparatus 10 according to the present embodiment, it is possible to objectively determine an attack countermeasure technique for each domain name with respect to attacks based on malicious domain names.

Furthermore, the attack countermeasure determination apparatus 10 specifies whether the domain name corresponds to the malicious domain name or the attack-specific domain name by using the category information, determines the attack countermeasure means for the specified domain name in accordance with the type of the specified domain name, and preferentially determines the attack countermeasure means corresponding to the malicious domain name with respect to the domain name when the domain name corresponds to both the malicious domain name and the attack-specific domain name. Therefore, in accordance with the attack countermeasure determination apparatus 10, the attack countermeasure means that does not block the authorized service is determined, so that it is possible to implement the attack countermeasure without blocking the authorized service.

In accordance with the attack countermeasure determination apparatus 10, the attack countermeasure means is determined in accordance with the type of the domain name, the attack countermeasure granularity is determined using the information of the category corresponding to the domain name, and the attack countermeasure information corresponding to the determined attack countermeasure means and attack countermeasure granularity is output. Therefore, the apparatus of the output destination can implement an appropriate attack countermeasure by using the attack countermeasure information.

Moreover, in order to determine the expiration date of the attack countermeasure against the domain name by using the information of the category corresponding to the domain name, the attack countermeasure determination apparatus 10 outputs or updates the attack countermeasure information at appropriate timing. Consequently, the apparatus of the output destination can use the latest attack countermeasure information.

[System Configuration of Embodiment]

The elements of the attack countermeasure determination apparatus 10 illustrated in FIG. 1 are functionally conceptual and are not always physically configured as illustrated in FIG. 1. That is, the specific form of distribution and integration of the functions of the attack countermeasure determination apparatus 10 is not limited thereto, and can be configured by functionally or physically distributing or integrating the whole or a part thereof in a certain unit in accordance with various loads, use situations, and the like.

Furthermore, the whole or a certain part of the processes performed in the attack countermeasure determination apparatus 10 may be implemented by a central processing unit (CPU) and a computer program that is analyzed and executed by the CPU. Furthermore, each process performed in the attack countermeasure determination apparatus 10 may be implemented as hardware by a wired logic.

Furthermore, among the processes described in the embodiment, the whole or some of the processes described as being automatically performed can also be manually performed. Alternatively, the whole or some of the processes described as being manually performed can also be automatically performed using a known method. In addition, information including the processing procedure, the control procedure, the specific names, and various types of data and parameters described above and illustrated in the drawings can be appropriately changed unless otherwise specified.

(Computer Program)

Figure 19:
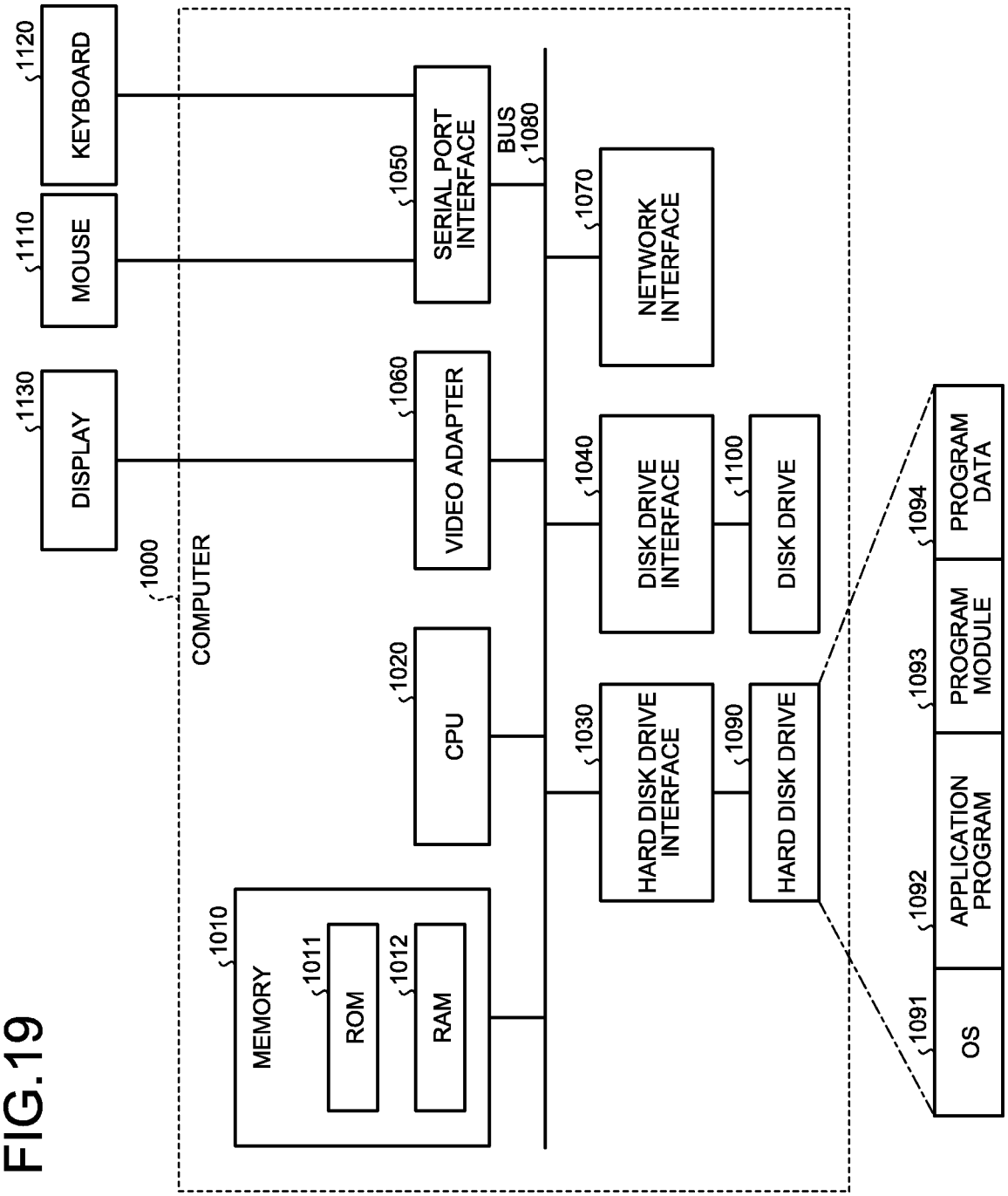
FIG. 19 is a diagram illustrating an example of a computer in which the attack countermeasure determination apparatus is implemented by executing a computer program.

FIG. 19 is a diagram illustrating an example of a computer in which the attack countermeasure determination apparatus 10 is implemented by executing a computer program. A computer 1000, for example, has a memory 1010 and a CPU 1020. Furthermore, the computer 1000 has a hard disk drive interface 1030, a disk drive interface 1040, a serial port interface 1050, a video adapter 1060, and a network interface 1070. These elements are connected to one another via a bus 1080.

The memory 1010 includes a read only memory (ROM) 1011 and a random access memory (RAM) 1012. The ROM 1011, for example, stores therein a boot program such as a basic input-output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to a mouse 1110 and a keyboard 1120, for example. The video adapter 1060 is connected to a display 1130, for example.

The hard disk drive 1090, for example, stores therein an operating system (OS) 1091, an application program 1092, a program module 1093, and program data 1094. That is, a computer program defining each process of the attack countermeasure determination apparatus 10 is implemented as the program module 1093 in which codes executable by the computer 1000 are written. The program module 1093 is stored in the hard disk drive 1090, for example. For example, the program module 1093 for performing a process similar to the functional configuration in the attack countermeasure determination apparatus 10 is stored in the hard disk drive 1090. In addition, the hard disk drive 1090 may be replaced by a solid state drive (SSD).

Furthermore, setting data used in the processing of the aforementioned embodiment is stored in the memory 1010 or the hard disk drive 1090, for example, as the program data 1094. In addition, the CPU 1020 reads the program module 1093 and the program data 1094 stored in the memory 1010 and the hard disk drive 1090 to the RAM 1012 as necessary and executes the read program module 1093 and program data 1094.

In addition, the program module 1093 and the program data 1094 are not limited to being stored in the hard disk drive 1090, and, for example, may be stored in a removable storage medium and read by the CPU 1020 via the disk drive 1100 or the like. Alternatively, the program module 1093 and the program data 1094 may be stored in other computers connected via networks (a local area network (LAN), a wide area network (WAN), and the like). In addition, the program module 1093 and the program data 1094 may be read from the other computers by the CPU 1020 via the network interface 1070.

So far, although the embodiment to which the invention made by the present inventor has been applied has been described, the present invention is not limited by the description and drawings constituting a part of the disclosure of the present invention, according to the present embodiment. That is, all other embodiments, examples, operational technologies, and the like made by a person skilled in the art or the like on the basis of the present embodiment are included in the scope of the present invention.

REFERENCE SIGNS LIST 10 attack detection determination apparatus
11 domain name input unit
12 attack countermeasure means determination unit
13 attack countermeasure granularity determination unit
14 attack countermeasure expiration date determination unit
15 attack countermeasure information output unit
16 attack countermeasure determination unit

The invention claimed is:

1. An attack countermeasure determination apparatus comprising:
a memory; and
a processor coupled to the memory and programmed to execute a process comprising:
receiving an arbitrary domain name as input, and acquiring setting information corresponding to the domain name, registration information corresponding to the domain name, and external information corresponding to an address corresponding to the domain name, as feature information on the domain name;
first specifying a pre-designated category for the domain name on the basis of the feature information, and determining, in a stepwise manner, an attack countermeasure against the domain name in accordance with the specified category, the first specifying including determining an expiration date of the attack countermeasure against the domain name by using the information of the category specified for the domain name; and
outputting attack countermeasure information corresponding to the attack countermeasure, wherein
the stepwise manner includes at least three steps of specifying the domain name, specifying the pre-designated category, and determining the attack countermeasure, and
the outputting includes adding the expiration date of the attack countermeasure against the domain name and information, which instructs to discard the attack countermeasure information when the expiration date passes, to the attack countermeasure information, and outputting the attack countermeasure information to an output destination,
wherein the first specifying comprises second specifying whether the domain name corresponds to a malicious domain name created by abusing an authorized service or an attack-specific domain name created for an attack only, by using information of the category specified for the domain name, determining attack countermeasure means for the specified domain name in accordance with a type of the specified domain name, and determining attack countermeasure means corresponding to the malicious domain name with respect to the domain name when the domain name corresponds to both the malicious domain name and the attack-specific domain name.

2. The attack countermeasure determination apparatus according to claim 1, wherein the first specifying sequentially determines attack countermeasure means, an attack countermeasure granularity, and an expiration date of the attack countermeasure.

3. The attack countermeasure determination apparatus according to claim 1, wherein the first specifying comprises:
third specifying operational features of the domain name from a state of an upper domain name or a lower domain name of the domain name or a state of content present under the domain name by using the information of the category specified for the domain name, and determining an attack countermeasure granularity for the domain name.

4. The attack countermeasure determination apparatus according to claim 1, wherein the outputting outputs the attack countermeasure information in a data format corresponding to a type of an apparatus of an output destination.

5. An attack countermeasure determination method performed by an attack countermeasure determination apparatus, the attack countermeasure determination method comprising the steps of:
a step of receiving an arbitrary domain name as input, and acquiring setting information corresponding to the domain name, registration information corresponding to the domain name, and external information corresponding to an address corresponding to the domain name, as feature information on the domain name;
a step of specifying a pre-designated category for the domain name on the basis of the feature information, and determining, in a stepwise manner, an attack countermeasure against the domain name in accordance with the specified category, the step of specifying including determining an expiration date of the attack countermeasure against the domain name by using the information of the category specified for the domain name; and
a step of outputting attack countermeasure information corresponding to the attack countermeasure, wherein
the stepwise manner includes at least three steps of specifying the domain name, specifying the pre-designated category, and determining the attack countermeasure, and
the step of outputting includes adding the expiration date of the attack countermeasure against the domain name and information, which instructs to discard the attack countermeasure information when the expiration date passes, to the attack countermeasure information, and outputting the attack countermeasure information to an output destination,
wherein the step of specifying comprises second specifying whether the domain name corresponds to a malicious domain name created by abusing an authorized service or an attack-specific domain name created for an attack only, by using information of the category specified for the domain name, determining attack countermeasure means for the specified domain name in accordance with a type of the specified domain name, and determining attack countermeasure means corresponding to the malicious domain name with respect to the domain name when the domain name corresponds to both the malicious domain name and the attack-specific domain name.

6. A non-transitory computer-readable recording medium having stored therein an attack countermeasure determination program for causing a computer to execute a process comprising:
a step of receiving an arbitrary domain name as input, and acquiring setting information corresponding to the domain name, registration information corresponding to the domain name, and external information corresponding to an address corresponding to the domain name, as feature information on the domain name;
a step of specifying a pre-designated category for the domain name on the basis of the feature information, and determining, in a stepwise manner, an attack countermeasure against the domain name in accordance with the specified category, the step of specifying including determining an expiration date of the attack countermeasure against the domain name by using the information of the category specified for the domain name; and
a step of outputting attack countermeasure information corresponding to the attack countermeasure, wherein:
the stepwise manner includes at least three steps of specifying the domain name, specifying the pre-designated category, and determining the attack countermeasure, and
the step of outputting includes adding the expiration date of the attack countermeasure against the domain name and information, which instructs to discard the attack countermeasure information when the expiration date passes, to the attack countermeasure information, and outputting the attack countermeasure information to an output destination,
wherein the step of specifying comprises second specifying whether the domain name corresponds to a malicious domain name created by abusing an authorized service or an attack-specific domain name created for an attack only, by using information of the category specified for the domain name, determining attack countermeasure means for the specified domain name in accordance with a type of the specified domain name, and determining attack countermeasure means corresponding to the malicious domain name with respect to the domain name when the domain name corresponds to both the malicious domain name and the attack-specific domain name.

* * * * *